Figure 1:
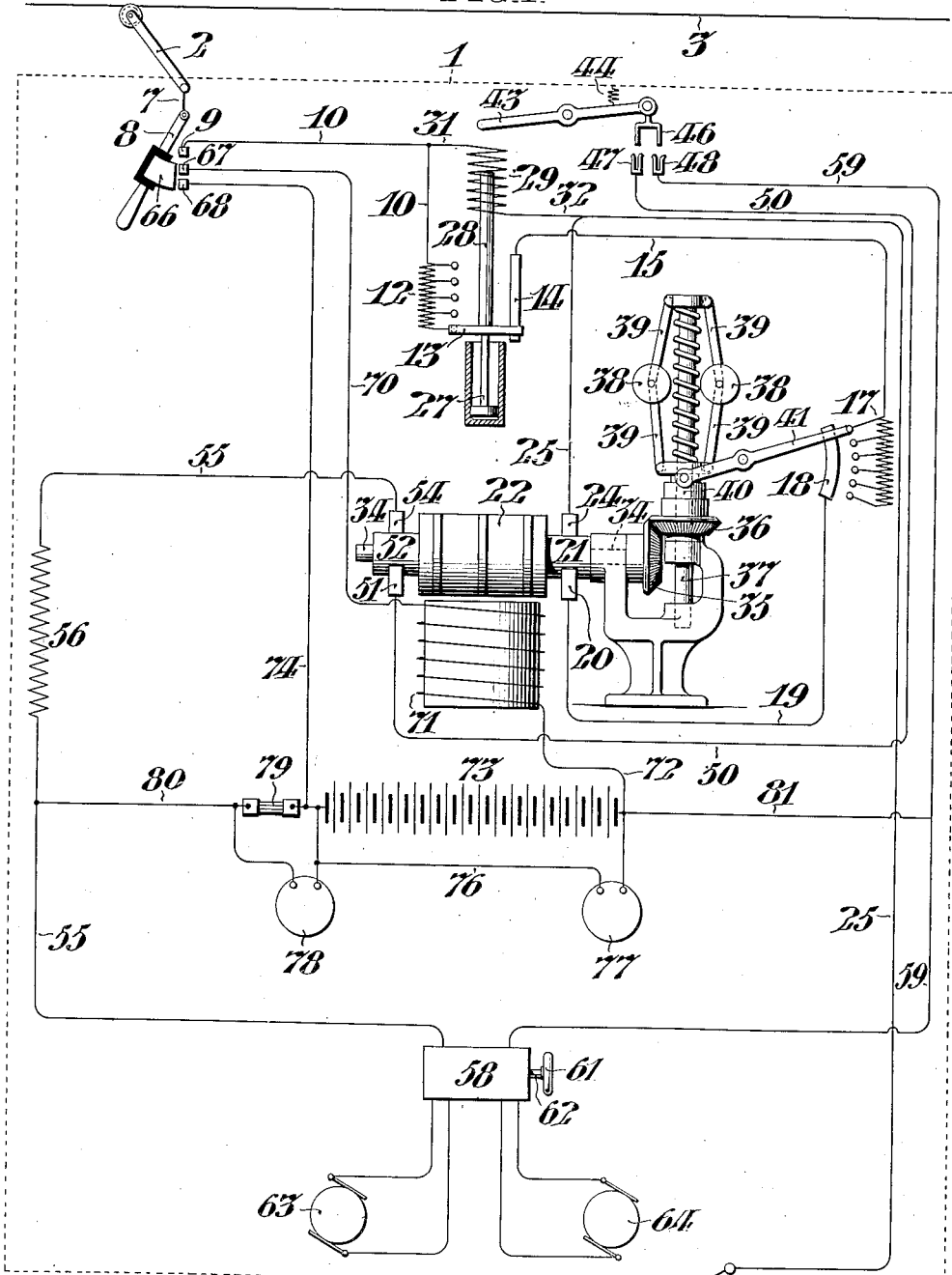

No. 840,865.  
PATENTED JAN. 8, 1907.  
M. PFATISCHER.  
ELECTRICALLY PROPELLED VEHICLE.  
APPLICATION FILED NOV. 25, 1905.

2 SHEETS—SHEET 1.

WITNESSES:  
Clifton C. Hallowell  
John C. Bergner

INVENTOR:  
MATHIAS PFATISCHER,

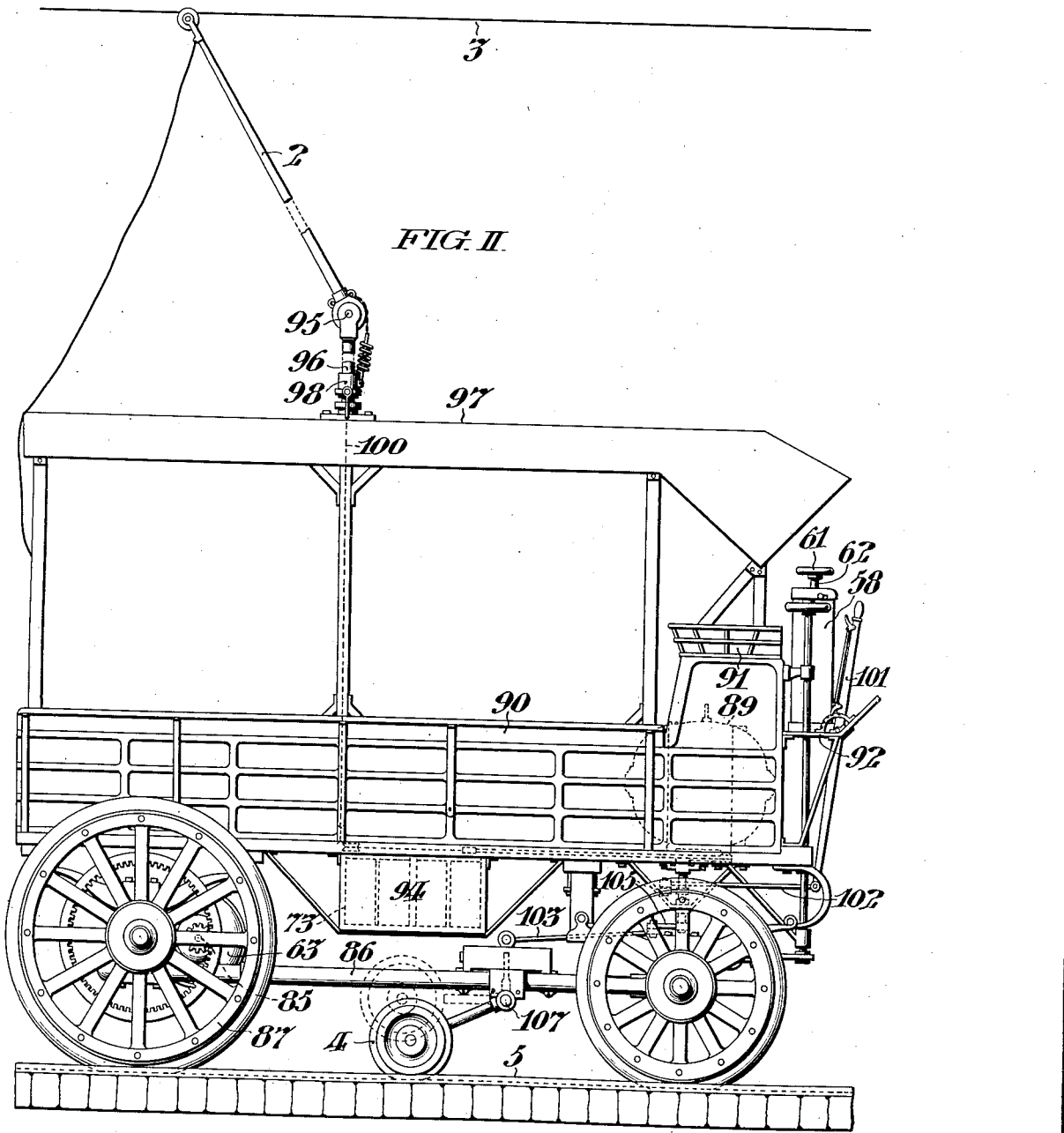

UNITED STATES PATENT OFFICE.

MATHIAS PFATISCHER, OF PHILADELPHIA, PENNSYLVANIA, ASSIGNOR TO RUSSELL THAYER, OF PHILADELPHIA, PENNSYLVANIA.

ELECTRICALLY-PROPELLED VEHICLE.

No. 840,865.

Specification of Letters Patent.

Patented Jan. 8, 1907.

Application filed November 25, 1905. Serial No. 289,008.

*To all whom it may concern:*

Be it known that I, MATHIAS PFATISCHER, of Philadelphia, in the State of Pennsylvania, have invented certain new and useful Improvements in Electrically-Propelled Vehicles, whereof the following is a specification, reference being had to the accompanying drawings.

My improvements are particularly applicable to vehicles of the type described in Letters Patent of the United States No. 764,020, granted to Russell Thayer July 5, 1904. Such a vehicle is provided with electric motors and a storage battery and has wheels constructed and arranged to traverse the tracks of a railway supply system with said motors in operative connection with said system and to traverse a trackless road-bed independently of said system with said motors in operative connection with said battery.

My invention relates particularly to the electrical connection and arrangement of the elements carried by such a vehicle and provides means to permit the contemporaneous charging of a storage battery and operation of a motor by connection with a railway supply system when the current on said system is of such voltage as not to be directly applicable to charge said storage battery.

In the form of my invention hereinafter described a storage battery is arranged in parallel relation with a transforming device—viz., a dynamotor arranged to take a primary direct current from a railway supply system at five hundred volts and to generate a secondary direct current at approximately one hundred volts to supply a battery and a motor or motors—the latter being in operative relation with the driving-wheels of the vehicle. Moreover, the secondary circuit of the dynamotor includes an iron-resistance medium, which by reason of its natural increase in resistance in correspondence with any increase in its temperature automatically checks any tendency of the current to suddenly increase.

The arrangement above contemplated, which is hereinafter more particularly set forth, has certain characteristics, as follows: First, the speed of rotation of the dynamotor-armature tends to vary in correspondence with variations in the voltage of the supply-circuit; second, the resistance in the dynamotor-armature primary circuit is increased automatically in correspondence with any increase in speed of rotation of the armature, and vice versa, whereby the current in the secondary circuit is maintained approximately constant.

My invention comprises the various novel features of construction and arrangement hereinafter more definitely specified.

In the drawings, Figure I diagrammatically indicates the relative arrangement of the elements carried by the vehicle and their relation to the railway supply system; but it is to be understood that it is not intended to show the relative dimensions of said elements. Fig. II is a side elevation of a vehicle of the class contemplated and embodying my improvements.

Referring to Fig. I, the dotted line 1 incloses the elements which are carried by the vehicle, 2 being the pole whereby connection is conveniently made to the overhead wire 3 of the railway supply system, and 4 being a contact-wheel whereby ground connection is made conveniently with the tracks 5, which support the vehicle, as hereinafter described. The lead 7 extends from said pole 2 to the manually-operative switch 8, arranged to make or break contact with the terminal 9 of the lead 10, and the latter extends to the rheostat-coils 12. Said coils 12 are variably connected by the removable contact member 13 with the rheostat-terminal 14, which is connected by the lead 15 with the rheostat-coils 17. The terminal 18 of said rheostat is connected by the lead 19 with the brush 20 of the commutator 21 of the motor-armature coils 22 of the dynamotor. The opposite brush 24 of said commutator is connected by the lead 25 with the ground contact-wheel 4. Said variable contact member 13 is carried by the dash-pot plunger 27 and so arranged that when the circuit is broken by the switch-lever 8 all of the rheostat-coils 12 are included in the circuit, as indicated in Fig. I; but when the circuit is established by said switch-lever 8 said coils 12 are successively excluded from the circuit automatically by the coöperation of the solenoid-core 28 and coil 29, the former being operatively connected with said member 13 and the latter being connected with the lead 10 by the lead 31 and with the ground contact-wheel 4 by the lead 32. The dynamotor-armature shaft 34 carries the beveled gear 35, operatively connected with the gear 36, on the governor-shaft 37, which has the opposed weights 38 suspended therefrom by the toggle-levers 39, so as to vary the position of the collar 40 in accordance with the speed of rotation of said armature-shaft 34. Said collar 40 is in such operative relation with the rheostat-lever 41 as to include more or less of the rheostat-coils 17 in said motor-armature circuit in accordance with the changes in the speed of rotation of said armature-shaft 34. Said solenoid-core 28 is in such relation to the switch-lever 43 as to tilt the latter against the tension of the spring 44 as said core rises to its upper position under the magnetic stress of the coil 29. Said lever 43 carries the bridge 46, which is arranged to connect the terminals 47 and 48 in the secondary circuit when said lever 43 is tilted, as above described, but which is disconnected therefrom when the switch-lever 8 is open, as indicated in Fig. I. Said terminal 47 is connected by the lead 50 with the brush 51 of the commutator 52, whose opposite brush 54 is connected by the lead 55 through the permanent resistance-coil 56 with the controller 58. Said terminal 48 is connected by the lead 59 with said controller 58. Said controller 58 comprises the handwheel 61, shaft 62, and such other elements in coöperative relation therewith as to enable the operator to connect the motors 63 and 64 in series of parallel relation and to reverse the same. Said switch-lever 8 carries the plate 66, which is arranged to connect the terminals 67 and 68 when said lever is shifted to close the circuit through the terminal 9 and lead 10. Said terminal 67 is connected by the lead 70 with the field-coil 71 of the dynamotor, which is connected by the lead 72 with the battery 73, which latter is connected upon its opposite side by the lead 74 with said switch-terminal 68. Said coil 71 is so proportioned and arranged as to maintain an approximately constant field by reason of the saturation of the iron included therein. Said battery 73, being provided with the instrument-circuit 76, including the voltmeter 77, ammeter 78, and the shunt 79, associated with the latter, is connected by the leads 80 and 81 with the leads 55 and 59 in parallel relation with the controller 58, so as to be energized contemporaneously with the operation of said motors 63 and 64 when the dynamotor is in circuit, during which time any variation in speed of rotation of the armature-shaft 34 causes the governor-lever 41 to vary the amount of the rheostat-coils 17 included in the motor-armature circuit of the dynamotor, so as to increase the resistance when the speed is increased, and vice versa, which variation in resistance, together with the effect of the permanent iron resistance 56, maintains the current in the secondary circuit substantially constant, the field 71 of the dynamotor being saturated, as aforesaid, so as to give a substantially constant flux. It is to be understood that said permanent iron-resistance coil 56 serves to check any sudden increases of current, such as occur, for instance, during the period of starting.

Referring to Fig. II, it is to be understood that said motors 63 and 64 may be arranged in axial alinement on the shaft 85, supported by the vehicle-frame 86, or may be otherwise disposed in operative relation to the vehicle-supporting wheels 87, which, as above noted, are constructed and arranged to traverse the tracks 5 of a railway supply system with said motor or motors in operative connection with said system and to traverse a trackless roadbed independently of said system with said motors in operative connection with said battery 73. A dynamotor 89, which comprises the field-coil 71, its armature, &c., above described, may be conveniently carried in the vehicle-body 90, beneath the chauffeur's seat 91 in operative connection with the controller 58, which is supported by the footboard 92 in front of said seat, and the battery 73 may be disposed in the casing 94 beneath said body 90. The pole 2, whereby the apparatus carried by the vehicle is connected with the overhead wire 3, is pivoted at 95 on the standard 96, which is mounted upon the roof 97 in said vehicle. Said pole 2 may be conveniently raised and lowered by corresponding vertical movements of the collar 98 on said standard 96, said collar being operated by the flexible connector 100, extending to the vertical lever 101 at the front of the vehicle, which lever is also operatively connected by the links 102 and 103, rock-lever 105, &c., to raise and lower a pair of ground contact-wheels 4, carried by the shaft 107, suspended from the vehicle-frame 86.

In the position of the apparatus shown in Fig. I the circuits which establish connection between the vehicle and the railway supply system are all open and inoperative, the only operative circuit being that which includes the battery 73 in connection with the controller 58 and through the latter with the motors 63 64, which circuit includes the lead 55, from the controller 58, the lead 80, shunt 79, battery 73, lead 81, and the lead 59, extending to the controller 58, the instrument-circuit 76, including the voltmeter 77 and ammeter 78, being in parallel relation with the battery and the ammeter 78 being in parallel relation with the shunt 79 aforesaid. The vehicle being so disposed that the pole 2 and contact-wheel 4 are respectively in electrical contact with the overhead wire 3 and tracks 5 of the railway supply system to start the vehicle, the switch 8 is swung toward the right-hand side of Fig. I, establishing circuits as follows: Said switch 8 makes direct connection between the lead 7 of said pole 2 and the terminal 9 of the lead 10 of the circuit, including the rheostat-coils 12, movable contact member 13, rheostat-terminal 14, lead 15, rheostat-coil 17, rheostat-lever 41, rheostat-terminal 18, lead 19, brush 20, commutator 21, motor-armature coils 22 of the dynamotor, brush 24, lead 25, and ground contact-wheel 4 to the track 5. Contemporaneously the parallel circuit is established from said lead 10 to the lead 25, connecting with the track 5 through the solenoid-coil 29, so that the latter is uplifted, gradually reducing the resistance of the rheostat 12, and finally shifting the switch-lever 43 against the tension of the spring 44 until the bridge 46 is lowered to establish connection between the terminals 47 and 48 in the secondary circuit, which includes the lead 50, brush 51, commutator 52, brush 54, lead 55, (including the resistance-coil 56,) controller 58, lead 59, and terminal 48. The battery 73 is also included in the secondary circuit last described in parallel relation with the controller 58, the circuit being established between the leads 55 and 59, through the lead 80, shunt 79, battery 73, and lead 81 and also through the instrument-circuit 76, including the voltmeter 77 and ammeter 78, the shunt 79 being associated with the latter. The aforesaid movement of said lever 8 toward the right causes the plate 66 carried thereby to connect the terminals 67 and 68, so as to establish a circuit in which the secondary coil 71 of the dynamotor is in series relation with the battery 73 and in parallel relation with the controller 58, said circuit including the lead 70 and dynamotor field-coil 71, which is connected by the lead 72 with the battery 73, lead 74, and terminal 68. Of course when it is desired to change from the trolley system to the battery system disconnection may be effected by merely lowering the pole 2 from electrical contact with the overhead wire 3 without disconnecting the switch 8 from the contacts 9, 67, and 68, in which case the solenoid-core 28, with its movable contact 13, would sink to the position shown in Fig. I, first releasing the lever 43, so that the bridge 46 is uplifted, and thus disconnected, by the spring 44.

I do not desire to limit myself to the precise construction and arrangement herein set forth, as various modifications may be made therein without departing from the essential features of my invention.

I claim—

1. In a vehicle of the class described, the combination with a storage battery; of a motor arranged to propel the vehicle; a dynamotor comprising a motor-armature coil, a generator-armature coil and a field-coil common to both of said armature-coils; a controller operatively connecting said battery, dynamotor and motor; and, means arranged to operate said motor directly by connection with said battery and indirectly by connection with the railway supply system through said dynamotor, comprising means to connect a motor-armature coil of said dynamotor directly with said system and to contemporaneously connect said field-coil with said battery, substantially as set forth.

2. In a vehicle of the class described, the combination with a storage battery; of a motor arranged to propel the vehicle; a dynamotor; and, means arranged to operate said motor directly by connection with said battery and indirectly by connection with a railway supply system through said dynamotor, comprising means arranged to automatically vary the resistance in the motor-armature circuit of said dynamotor in accordance with the speed of rotation of said armature, substantially as set forth.

3. In a vehicle of the class described, the combination with a storage battery; of a motor arranged to propel the vehicle; a dynamotor comprising a motor-armature coil, a generator-armature coil and a field-coil, common to both of said armature-coils; and, means arranged to operate said motor directly by connection with said battery and indirectly by connection with a railway supply system through said dynamotor, comprising means arranged to automatically vary the resistance in the motor-armature circuit of said dynamotor in accordance with the speed of rotation of said armature, substantially as set forth.

4. In a vehicle of the class described, the combination with a storage battery; of a motor arranged to propel the vehicle; a dynamotor comprising a motor-armature coil, a generator-armature coil and a field-coil, common to both of said armature-coils; and, means arranged to operate said motor directly by connection with said battery and indirectly by connection with a railway supply system through said dynamotor, comprising means arranged to connect a motor-armature coil of said dynamotor directly with said system and to contemporaneously connect said field-coil with said battery, substantially as set forth.

5. In a vehicle of the class described, the combination with a storage battery; of a motor arranged to propel the vehicle; a dynamotor comprising a motor-armature coil, a generator-armature coil and a field-coil common to both of said armature-coils; means connecting said field-coil with said battery; and, means arranged to operate said motor directly by connection with said battery and indirectly by connection with a railway supply system through said dynamotor, comprising a controller in parallel relation with said battery in the secondary circuit of said dynamotor, substantially as set forth.

In testimony whereof I have hereunto signed my name, at Philadelphia, Pennsylvania, this 21st day of November, 1905.

MATHIAS PFATISCHER.

Witnesses:
ANNA F. GETZFREAD,
ARTHUR E. PAIGE.